United States Patent
Chen

(10) Patent No.: US 11,158,123 B2
(45) Date of Patent: Oct. 26, 2021

(54) METHOD FOR CONTROLLING VIRTUAL OBJECTS, STORAGE MEDIUM AND ELECTRONIC DEVICE

(71) Applicant: GUANGDONG OPPO MOBILE TELECOMMUNICATIONS CORP., LTD., Guangdong (CN)

(72) Inventor: Yan Chen, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 0 days.

(21) Appl. No.: 16/576,664

(22) Filed: Sep. 19, 2019

(65) Prior Publication Data

US 2020/0098175 A1 Mar. 26, 2020

(30) Foreign Application Priority Data

Sep. 25, 2018 (CN) .......................... 201811117000.4

(51) Int. Cl.
| | |
|---|---|
| *G06T 15/00* | (2011.01) |
| *G06T 19/00* | (2011.01) |
| *G06T 7/50* | (2017.01) |
| *G06K 9/00* | (2006.01) |

(52) U.S. Cl.
CPC .......... *G06T 19/00* (2013.01); *G06K 9/00362* (2013.01); *G06T 7/50* (2017.01); *G06T 2207/10004* (2013.01); *G06T 2207/10028* (2013.01); *G06T 2207/20084* (2013.01); *G06T 2207/20212* (2013.01)

(58) Field of Classification Search
CPC ......... G06T 19/00; G06T 17/20; G06T 17/00; G06T 15/10; G06T 15/00

USPC ........................................................ 345/419
See application file for complete search history.

(56) References Cited

U.S. PATENT DOCUMENTS

| | | | |
|---|---|---|---|
| 9,383,895 B1 * | 7/2016 | Vinayak | G06F 3/04883 |
| 2004/0155962 A1 | 8/2004 | Marks | |
| 2010/0303289 A1 | 12/2010 | Polzin et al. | |

(Continued)

FOREIGN PATENT DOCUMENTS

| | | |
|---|---|---|
| CN | 101086681 A | 12/2007 |
| CN | 103019570 A | 4/2013 |

(Continued)

OTHER PUBLICATIONS

International Search Report and written opinion for the PCT application No. PCT/CN2019/107956, dated Dec. 25, 2019.

(Continued)

*Primary Examiner* — Gordon G Liu
(74) *Attorney, Agent, or Firm* — Ladas & Parry, LLP

(57) ABSTRACT

Provided are a virtual object control method, a storage medium and an electronic device. The method includes: acquiring a two-dimensional image and a depth image of a human body; acquiring two-dimensional feature information of the human body according to the two-dimensional image, and acquiring three-dimensional feature information of the human body according to the depth image; combining the two-dimensional feature information of the human body with the three-dimensional feature information of the human body to generate human body model information; and controlling a virtual object according to the human body model information.

19 Claims, 6 Drawing Sheets

(56) References Cited

U.S. PATENT DOCUMENTS

| | | | |
|---|---|---|---|
| 2014/0309027 A1 | 10/2014 | Ichimura et al. | |
| 2015/0086108 A1* | 3/2015 | Craig | G06F 21/32 |
| | | | 382/154 |
| 2015/0123965 A1* | 5/2015 | Molyneaux | G06T 19/20 |
| | | | 345/419 |
| 2018/0039745 A1* | 2/2018 | Chevalier | G16H 10/60 |

FOREIGN PATENT DOCUMENTS

| | | |
|---|---|---|
| CN | 103927016 A | 7/2014 |
| CN | 105528082 A | 4/2016 |

OTHER PUBLICATIONS

Extended European Search Report of the EP patent application No. 19199604.0, dated Feb. 27, 2020.
Cao Zhe et al: "Realtime Multi-person 2D Pose Estimation Using Part Affinity Fields", IEEE Computer Society Conference on Computer Vision and Pattern Recognition. Proceedings, IEEE Computer Socitey, US, Jul. 21, 2017(Jul. 21, 2017), pp. 1302-1310, xp033249469, ISSN:1063-6919, DOI: 10.1109/CVPR.2017.143.
Mori G et al: "Recovering 3D Human Body Configurations Using Shape Contexts", IEEE Transactions on Pattern Analysis and Machine Intelligence, IEEE Computer Society, USA, vol. 28, No. 7, Jul. 1, 2006, (Jul. 1, 2006), pp. 1052-1062, XP001523468, ISSN:0162-8828, DOI: 10.1109/TPAMI.2006.149.
Examination Report for the India patent application No. 201914038655, dated Mar. 4, 2021.
The Communication pursuant to Article 94(3) EPC of the EP patent application No. 19199604.0, dated Mar. 19, 2021.

* cited by examiner

METHOD FOR CONTROLLING VIRTUAL OBJECTS, STORAGE MEDIUM AND ELECTRONIC DEVICE

CROSS-REFERENCE TO RELATED APPLICATION(S)

The present application claims benefit of and priority to Chinese Patent Application No. 201811117000.4, filed on Sep. 25, 2018 and entitled "Virtual Object Control Method, Storage Medium and Electronic Device", the contents of which are hereby incorporated by reference in its entirety.

TECHNICAL FIELD

The present disclosure relates to the field of data processing, and more particularly to a method for controlling virtual objects, a non-transitory computer readable storage medium and an electronic device.

BACKGROUND

In some disclosures of electronic devices, artificially set virtual objects, such as virtual objects in a video game or an instant messenger, are included.

A user can control these virtual objects by a button or a touch screen. Alternatively, in order to control these virtual objects, a user can grasp or wear a peripheral motion sensor, so that the motion sensor can acquire the hand motions of a human body and input feature parameters of the hand motions into a control model of the electronic device to perform corresponding motion control on the virtual object.

However, a conventional motion sensor requires to be connected to an external device, making it cumbersome for a user to use the motion sensor. In addition, the conventional motion sensor can only detect hand motions of the user, and therefore has a problem of low precision.

SUMMARY

In an aspect of the present disclosure, a method for controlling virtual objects is provided. The method may include the following operations.

A two-dimensional image and a depth image of a human body are acquired.

Two-dimensional feature information of the human body is acquired according to the two-dimensional image.

Three-dimensional feature information of the human body is acquired according to the depth image.

The two-dimensional feature information of the human body is combined with the three-dimensional feature information of the human body to generate human body model information.

A virtual object is controlled according to the human body model information.

In another aspect of the present disclosure, an electronic device is further provided. The electronic device, comprising an image sensor; a depth image sensor; a memory, configured to store executable program codes; a processor, coupled with the memory; wherein the image sensor is configured to acquire a two-dimensional image;

the depth image sensor is configured to acquire a depth image; and the processor is configured to invoke the executable program codes stored in the memory to perform the following operations:

acquiring two-dimensional feature information of the human body according to the two-dimensional image;

acquiring three-dimensional feature information of the human body according to the depth image;

combining the two-dimensional feature information of the human body with the three-dimensional feature information of the human body to generate human body model information; and controlling a virtual object according to the human body model information.

In an additional aspect of the present disclosure, a non-transitory computer readable storage medium is provided, The non-transitory computer readable storage medium, being configured to store programs, which when executed by a processor, are operable with the processor to carry out operations comprising:

acquiring a two-dimensional image and a depth image of a human body;

acquiring two-dimensional feature information of the human body according to the two-dimensional image;

acquiring three-dimensional feature information of the human body according to the depth image;

combining the two-dimensional feature information of the human body with the three-dimensional feature information of the human body to generate human body model information; and controlling a virtual object according to the human body model information.

BRIEF DESCRIPTION OF THE DRAWINGS

The technical solutions of the present disclosure and the beneficial effects thereof will be apparent from the following detailed description of the Detailed Description of the Embodiments in conjunction with the drawings.

DETAILED DESCRIPTION OF THE EMBODIMENTS

Figure 1:
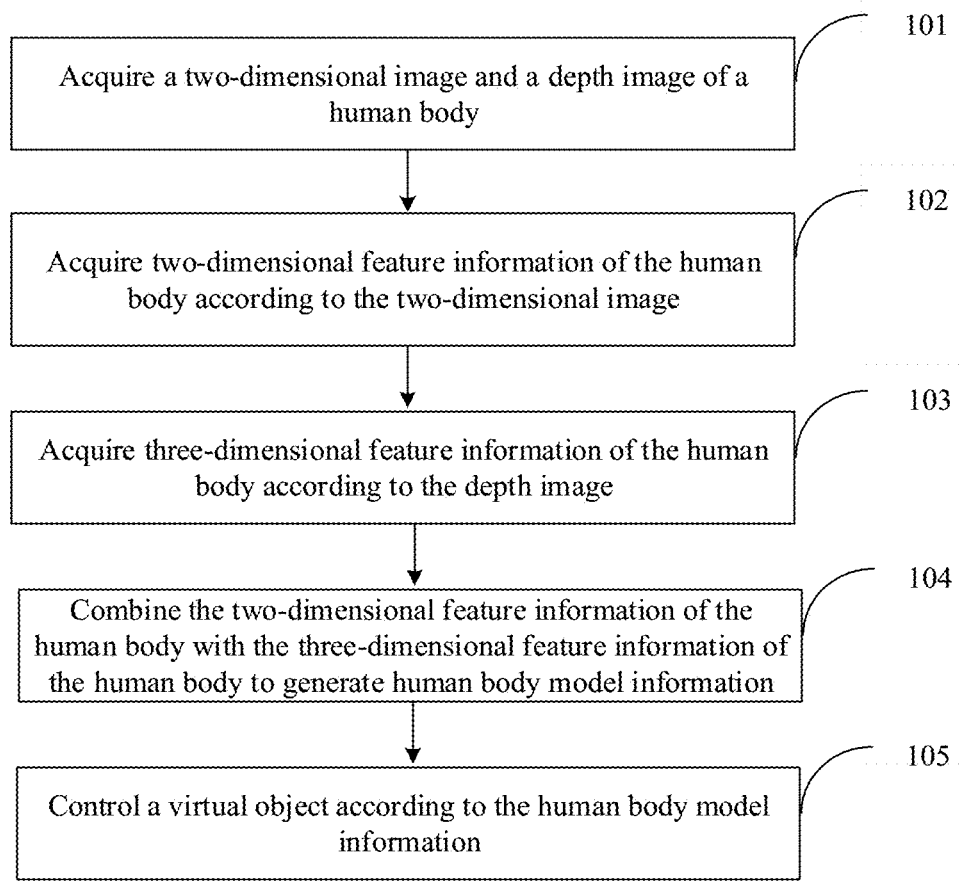
FIG. 1 is an implementation flowchart of a method for controlling virtual objects according to an embodiment of the present disclosure.

Referring to the drawings, like reference numerals represent the same components, and the principles of the present disclosure are illustrated in the context of a suitable operation environment. The following description is based on the exemplified specific embodiments of the present disclosure, which are not to be construed as limiting other specific embodiments of the present disclosure not detailed herein.

The embodiments of the present disclosure provide a method for controlling virtual objects, a non-transitory computer readable storage medium and an electronic device. The details will be described separately below. The electronic device may be a smart phone, a tablet computer or the like.

The electronic device in the embodiments of the present disclosure may include a smart phone or a portable computer having a wireless communication module such as a tablet computer and a laptop, or may also be a wearable or handheld computer such as a smart wearer or a Personal Digital Assistant (PDA), which is not limited herein.

When the method is applied to the electronic device, the method for controlling virtual objects may be run in an operating system of the electronic device, which may include, but is not limited to, a Windows operating system, a Mac OS, an Android operating system, an 1OS, a Linux operating system, a Ubuntu operating system, a Windows Phone operating system, and the like, which are not limited in the embodiments of the present disclosure. The embodiments of the present disclosure provide a method for controlling virtual objects, a non-transitory computer readable storage medium and an electronic device. The details will be described separately below.

The method for controlling virtual objects may be applied to an electronic device. The electronic device may be the electronic device mentioned in the above embodiment.

Referring to FIG. 1, the figure shows an implementation flow of a method for controlling virtual objects according to an embodiment of the present disclosure.

The virtual object control method may include the following operations.

At block 101: A two-dimensional image and a depth image of a human body are acquired.

The two-dimensional image is an image composed of a plurality of pixels (sampling points), which may be a color image or a monochrome image. The two-dimensional image may be acquired by an image sensor. The image sensor may be an RGB image sensor or may also be an infrared sensor. An image containing two-dimensional information of an environment object is acquired by the image sensor.

The depth image is also an image composed of a plurality of pixels (sampling points), and may include position information of each pixel (sampling point) in the depth image and a depth parameter corresponding to each pixel (sampling point), where the depth parameter is a distance value between hardware for acquiring the depth image and a real object corresponding to the pixel point in the depth image.

The depth image may be acquired by a depth image sensor, wherein the depth image sensor includes a time-of-flight (TOF) image sensor or a structured light sensor.

For example, if an RGB image sensor and a depth image sensor are used to acquire environmental information in a field of view, a colorful two-dimensional image and a depth image of the environment may be acquired by the image sensor, and the depth image includes a distance between the depth image sensor and each object in the environment.

At block 102: Two-dimensional feature information of the human body is acquired according to the two-dimensional image.

Through the two-dimensional image, feature identification may be performed on the two-dimensional image to determine the position of the human body and an image range of the human body.

In at least one exemplary implementation, feature identification may be performed on the two-dimensional image by using a preset neural network model to determine whether an image of a human body exists in the two-dimensional image by identifying whether the two-dimensional image includes feature parts of the human body.

When it is determined that there is an image of the human body, the motion of the human body is determined according to the positional change of the feature parts.

In some embodiments, in order to construct the two-dimensional feature information of the human body to apply the two-dimensional feature information to control of a virtual object, the operation that two-dimensional feature information of the human body is acquired according to the two-dimensional image may be implemented in the following manner.

Feature parts of the human body and corresponding positions of the feature parts are identified according to the two-dimensional image by using a preset neural network model; and two-dimensional feature information of the human body is constructed according to the feature parts of the human body and the corresponding feature positions of the feature parts.

The two-dimensional feature information includes feature parts of the human body and corresponding positions of the feature parts, so that when a user makes a motion, the motion type and motion track of the user may be determined by identifying the position change of the feature parts of the human body of the user.

In some embodiments, the feature parts may be key parts of the human body, such as a main articulation point of the human body, or a hand or head of the human body.

In at least one exemplary implementation, the feature parts may include a head, a neck, a left shoulder, a left elbow, a left wrist, a left waist, a left knee, a left ankle, a right shoulder, a right elbow, a right wrist, a right waist, a right knee, a right ankle or the like of the human body.

It will be appreciated that the actual disclosure may not be limited to the above-mentioned feature parts, and may be other more detailed parts, such as the eyes, ears, nose and mouth of the human body, which will not be described herein.

In some embodiments, an image may be identified by a mobilenet-Openpose model to identify two-dimensional feature information of the human body.

At block 103: Three-dimensional feature information of the human body is acquired according to the depth image.

The three-dimensional feature information may include depth parameters of various portions in a range of the human body in the image, so that three-dimensional images of the human body may be constructed by the depth parameters.

In some embodiments, in order to acquire the three-dimensional feature information of the human body, a range of the human body in the depth image and depth parameters within the range are acquired. The process of acquiring the three-dimensional feature information of the human body according to the depth image may be implemented in the following manner.

The depth image is analyzed to acquire a contour image and corresponding depth parameter of respective portions of the contour image; and the three-dimensional feature information of the human body is constructed according to the contour image and the corresponding depth parameters.

By segmenting the depth image, the contours of all objects in the depth image can be acquired. The image may be segmented using a histogram segmentation algorithm.

Then, by using the acquired two-dimensional feature information, the position of the contour to which the human body belongs in the depth image can be identified, and then the depth parameter corresponding to each portion of the contour to which the human body belongs is determined.

After acquiring the contour image of the human body and the corresponding depth parameters of respective portions of the contour image, the three-dimensional feature information of the human body can be acquired according to the above data.

Due to the factor that there is no interrelation or dependency relationship between the blocks 102 and 103, no specific sequence for executing the blocks 102 and 103 is limited herein. Although it is shown in FIG. 1 that the block 103 is executed after the block 102, it is appreciated that flows in which the block 102 is executed after the block 103 or flows in which the blocks 102 and 103 are executed simultaneously or independently are also acceptable.

At block 104: The two-dimensional feature information of the human body is combined with the three-dimensional feature information of the human body to generate human body model information.

The human body model information may be information to be input for controlling the virtual object. In at least one exemplary implementation, the information may be a position change parameter of the acquired feature part of the human body, such as a displacement distance and a swing frequency of each part of the human body. The position change parameter may be related to a depth parameter of each part of the human body and a displacement parameter in the two-dimensional image, or may be three-dimensional shape information of the human body formed by the position change parameter of the feature part of the human body.

Of course, the human body model information may also be other information related to the acquired human body motion change required to form a human body model according to a preset construction manner, and a specific form of the human body model may be determined according to actual conditions.

Compared with the method of forming the human body model information based on the depth parameter only, or by merely identifying the human image in the two-dimensional image, the embodiment combines the two-dimensional feature information of the human body with the three-dimensional feature information of the human body to acquire the human body model information, so that human-related motion data can be acquired from different dimensions, making the acquired human motion parameters more precise, thereby greatly improving the control precision in the process of controlling virtual objects by using human motion.

At block 105: A virtual object is controlled according to the human body model information.

The virtual object may be a fictitious character. The virtual object may be modeled according to a construction rule of the human body model information, that is, the virtual object may be in mutual correspondence with human body feature point information corresponding to the human body model information. The virtual object may be a character in a game application or a virtual character in an instant communication process.

Further, the body part of the human body model information may be tracked, such as the head, the body, and posture angles of the hand(s) and the foot (feet), to determine the corresponding motion posture, such as squatting, jumping, or waving. The virtual object is controlled to make a corresponding action according to the determined motion posture.

It can be seen that in the embodiments of the present disclosure, a two-dimensional image and a depth image of a human body are acquired, corresponding two-dimensional feature information and three-dimensional feature information of the human body are extracted from the two-dimensional image and the depth image, and the two-dimensional feature information and the three-dimensional feature information are combined to generate human body model information for controlling a virtual object. The embodiments of the present disclosure may combine the advantages of a two-dimensional image and a depth image to identify the motions of different parts of a human body, so that the precision of parameters of human body model information is greatly improved, thereby improving the control precision of a virtual object.

Figure 2:
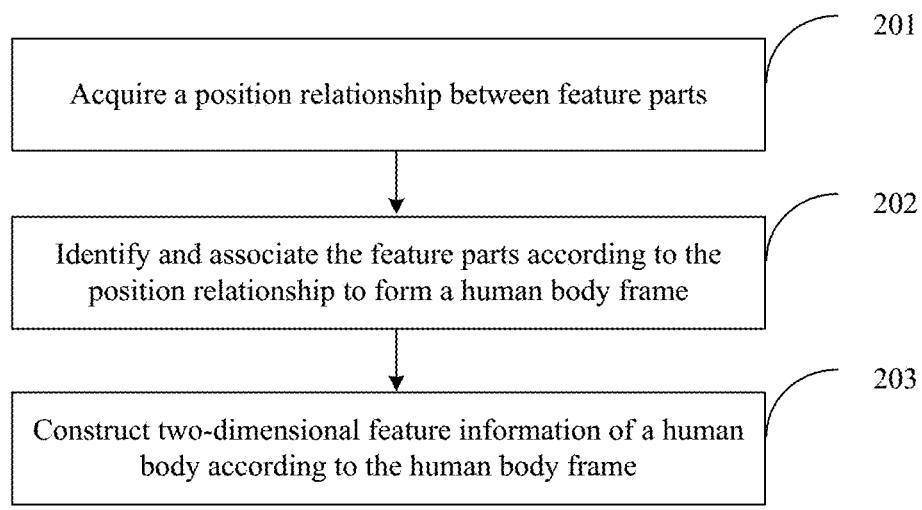
FIG. 2 is an implementation flowchart of acquiring two-dimensional feature information according to an embodiment of the present disclosure.

Referring to FIG. 2, the figure shows implementation operations of acquiring two-dimensional feature information according to an embodiment of the present disclosure.

The operation that two-dimensional feature information of the human body is acquired according to the two-dimensional image includes the operations as follows.

At block 201: A position relationship between the feature parts is acquired.

The position relationship is a relative position between various feature parts.

For example, the head is on the upper side of the shoulder and the feet are on the lower side of the shoulder. Of course, the above-mentioned "upper side" and "lower side" are only optional relative positional relationships, and do not limit the specific content.

The position relationship may be preset algorithm data. The preset algorithm data may be stored at a specified storage position of the electronic device or stored in a specified server position, which is not limited herein.

At block 202: The feature parts are identified and associated according to the position relationship to form a human body frame.

In the process of identifying the feature parts, a neural network model may identify candidate points of each feature in the image, and the position of each feature part may be determined according to a position relationship between the candidate points.

In some embodiments, the feature points in the two-dimensional image may be identified using Mobilenet-Openpose and the body frame may be formed using the positions of the feature parts.

Figure 3:
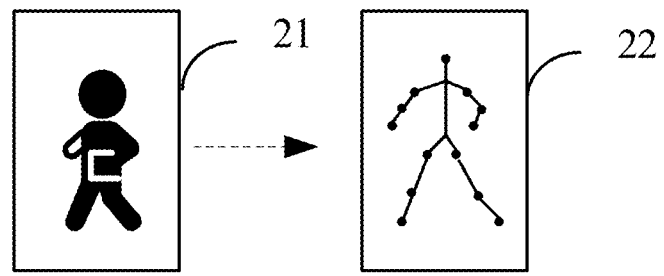
FIG. 3 is an application scenario of a method for controlling virtual objects according to an embodiment of the present disclosure.

In at least one exemplary implementation, referring to FIG. 3, which shows an application scenario of a method for controlling virtual objects according to an embodiment of the present disclosure, a two-dimensional image 21 and a human body frame image 22 formed by the two-dimensional image 21 are included in the application scenario.

The two-dimensional image 21 in FIG. 3 is processed by Mobilenet-Openpose to generate a set of feature images to be input to a first stage. The first stage network generates a set of detection confidence images and a set of Partial Affinity Fields (PAFs). The network training iteratively predicts confidence images of the body part and the PAFs, and generates a vector image of a limb direction and a heat image of the candidate points. Finally, the body part candidates are acquired by performing non-maximal suppression, that is, the feature parts of the human body, that is, the black points in the human body frame image 22 are identified.

After identifying the feature parts of the human body, the feature parts of the human body may be connected (e.g., by the lines connecting two black points) according to relative positions between the acquired various feature parts to form a human body frame, which is shown as the "matchstick men" in the human body frame image 22 in FIG. 3.

At block 203: Two-dimensional feature information of the human body is constructed according to the human body frame.

If there are multiple frames of two-dimensional images, when the human body frame is formed, the two-dimensional feature information of the human body in different frames may be constructed according to the position change of the human body frame in different frames. Two-dimensional motion parameters of the human body during motion may be acquired according to the two-dimensional feature information of the human body in different frames.

It can be seen that in the embodiments of the present disclosure, the position relationship between the feature parts is acquired, the feature parts in the two-dimensional image are identified by using the Mobilenet-Openpose, and the human body frame is formed based on the position relationship of the feature parts and the two-dimensional feature information of the human body is acquired. By virtue of the method, the parameter precision of the two-dimensional feature information is improved, thereby facilitating improvement of the parameter precision of the human body model information acquired by using the two-dimensional feature information.

Figure 4:
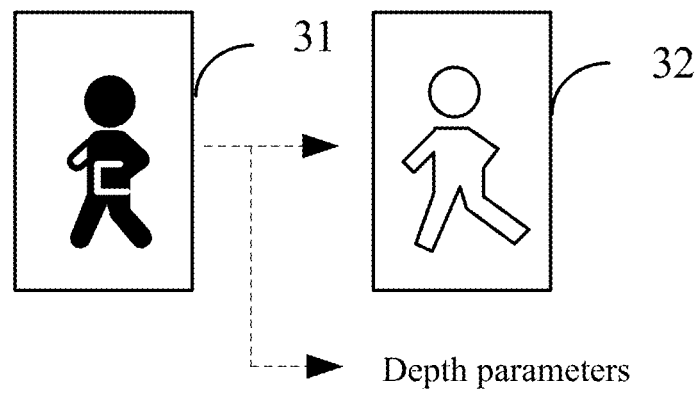
FIG. 4 is another application scenario of a method for controlling virtual objects according to an embodiment of the present disclosure.

In some embodiments, referring to FIG. 4, the operation that three-dimensional feature information of the human body is acquired according to the depth image includes the following operations.

(1) The depth image is analyzed to acquire a contour image and corresponding depth parameter of respective portions of the contour image.

(2) The three-dimensional feature information of the human body is constructed according to the contour image and the corresponding depth parameters.

FIG. 4 shows a depth image 31 and a contour image 32 acquired by segmentation.

The contour image 32 may be acquired by performing image segmentation on the depth image 31. For example, the contour image 32 is acquired by performing histogram segmentation on the depth image 31.

According to the contour image 32, the range of the human body in the contour image may be identified by analyzing the contour image 32.

In some embodiments, the range of the human body in the contour image 32 may be confirmed by combining the contour image 32 with the two-dimensional feature information of the human body.

In other embodiments, an identification algorithm may also be employed to identify features of the human body based on the contour image 32 to determine the range of the human body in the contour image 32.

Figure 5:
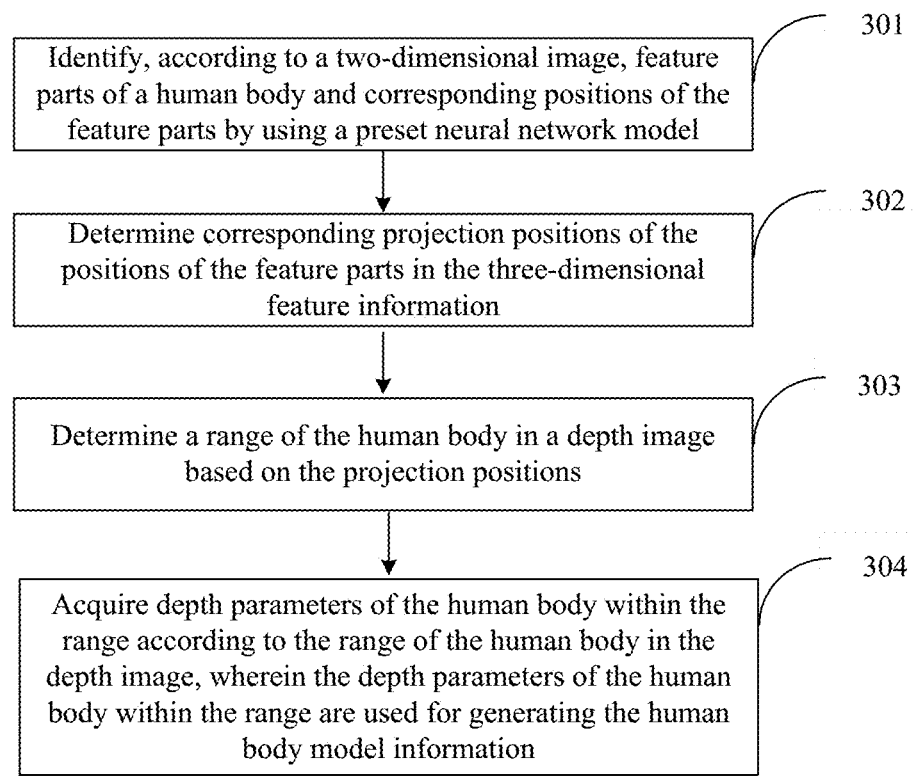
FIG. 5 is an implementation flowchart of combining two-dimensional feature information with three-dimensional feature information according to an embodiment of the present disclosure.

Referring to FIG. 5, the figure shows an implementation flow of combining two-dimensional feature information with three-dimensional feature information according to an embodiment of the present disclosure.

The operation that two-dimensional feature information of the human body is combined with the three-dimensional feature information of the human body to generate human body model information may include the following operations.

At block 301: According to the two-dimensional image, feature parts of the human body and corresponding positions of the feature parts are identified by using a preset neural network model.

The two-dimensional feature information includes feature parts of the human body and corresponding positions of the feature parts, so that when a user makes a motion, the motion type and motion track of the user may be determined by identifying the position change of the feature parts of the human body of the user.

At block 302: Corresponding projection positions of the positions of the feature parts in the depth image are determined.

Figure 6:
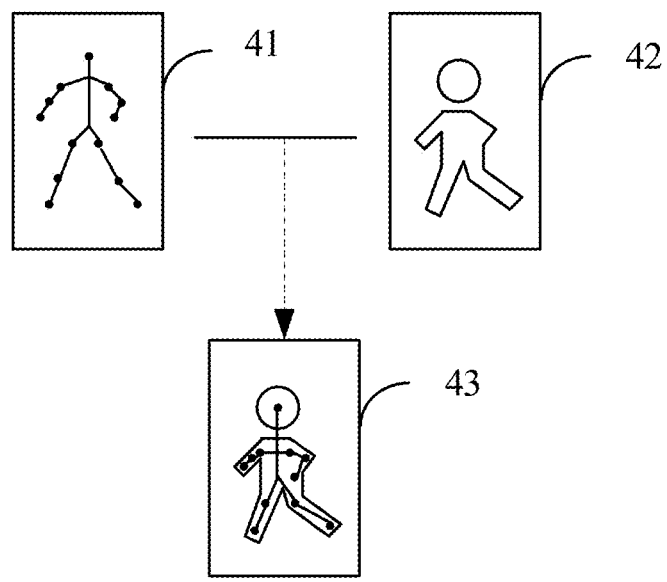
FIG. 6 is yet another application scenario of a method for controlling virtual objects according to an embodiment of the present disclosure.

FIG. 6 shows a projection image 41 of the positions of the feature parts in the depth image, a contour image 42 and a combined image 43 formed by combining the projection image 41 and the contour image 42.

In some embodiments, the image range of the two-dimensional image may correspond to the image range of the depth image. The position of the feature part is a position in the two-dimensional image, and a projection position of each feature part in the depth image may be determined by a correspondence relationship to form the projection image 41.

In some embodiments, if a pixel value of the two-dimensional image is different from a pixel value of the depth image, the position of the feature part in the two-dimensional image may be projected into the depth image by a projection relationship between the preset pixels to ensure the accuracy of the projection position of the feature part in the depth image.

It is to be noted that in the projection process of the depth image in the position of the feature part, it is necessary to guarantee that the two-dimensional image and the depth image to be images are acquired at the same time, so as to ensure the accuracy of projection.

At block 303: A range of the human body in the depth image is determined based on the projection positions.

In some embodiments, the operation that the range of the human body in the depth image is determined based on the projection positions may include the following operations.

The projection positions are combined with the contour image to determine a contour position of the human body contained in the contour image; and the range of the human body in the depth image is determined according to the contour position of the human body.

After determining the projection position of the feature part in the depth image, the range of the human body in the depth image may be determined according to the contour image 42 in the acquired depth image.

In at least one exemplary implementation, referring to the combined image 43, the projection positions of the feature parts in the depth image may be used as center points (at the black points in the figure), and a region (i.e., region in the contour) obtained by extending from the center points to the contour according to the acquired contour image 42 is determined as a range of the human body.

At block 304: Depth parameters of the human body within the range are acquired according to the range of the human body in the depth image, wherein the depth parameters of the human body within the range are used for generating the human body model information.

After the range of the human body in the depth image is determined, depth parameters corresponding to pixels within the range may serve as depth parameters of the human body to generate human body model information.

It can be seen that, in this embodiment, after identifying the feature parts of the human body and the corresponding positions of the feature parts, the feature parts are projected to the depth image to acquire corresponding projection positions, the range of the human body in the depth image is determined based on the projection positions, and depth parameters within the range are acquired as the depth parameters of the human body. By virtue of the method in the embodiment, the position of the human body in the depth image and the corresponding depth information may be determined more accurately to provide more accurate human body model information.

Figure 7:
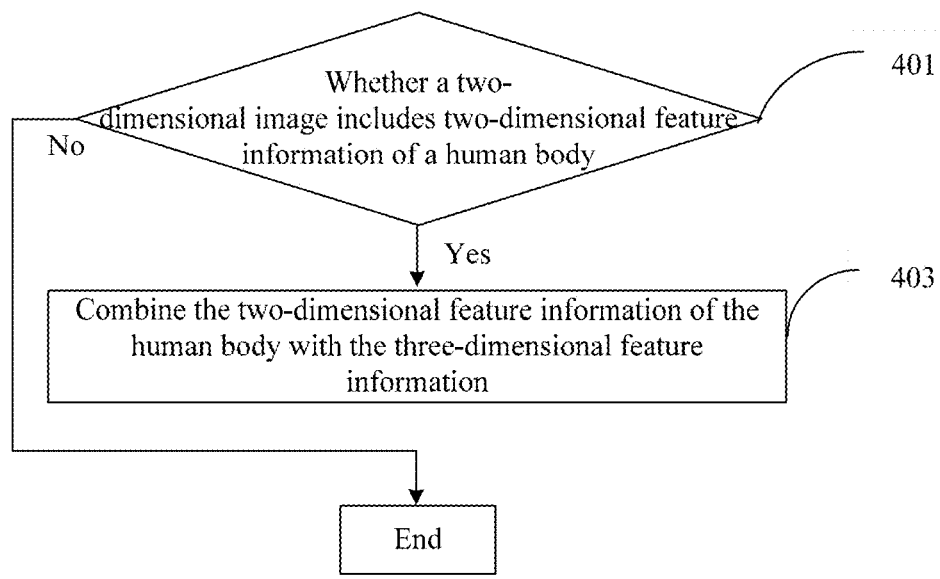
FIG. 7 is an implementation flowchart of determining whether to combine feature information according to an embodiment of the present disclosure.

Referring to FIG. 7, the figure shows implementation operations of determining whether to combine feature information according to an embodiment of the present disclosure.

In order to avoid misoperation caused by wrongly performing invalid control on a virtual object due to misjudgment, before combining the two-dimensional feature information of the human body with the three-dimensional feature information of the human body to generate human body model information, the method may further include that:

it is determined whether the two-dimensional image contains two-dimensional feature information of the human body; and in response to determining that the two-dimensional image does not contain the two-dimensional feature information of the human body, the operation of combining the two-dimensional feature information of the human body with the three-dimensional feature information of the human body is not performed.

In response to determining that the two-dimensional image does not contain the two-dimensional feature information of the human body, the flow ends, and the operation of combining the two-dimensional feature information of the human body with the three-dimensional feature information of the human body is not performed.

In at least one exemplary implementation, if it is determined in the process of identifying the feature part of the two-dimensional image that the two-dimensional image does not include the two-dimensional feature information of the human body, the process is ended to avoid misjudgment. Only when it is determined that the two-dimensional image includes the two-dimensional feature information of the human body, the operation of combining the two-dimensional feature information of the human body with the three-dimensional feature information of the human body is performed, so that erroneous operations and power consumption in the virtual object control process can be effectively reduced.

In some embodiments, frame alignment may be performed on the two-dimensional image corresponding to the two-dimensional feature information and the depth image corresponding to the three-dimensional feature information, so as to guarantee that the two-dimensional image and the depth image correspond to the same moment, thereby improving the accuracy of the image analysis process.

Figure 8:
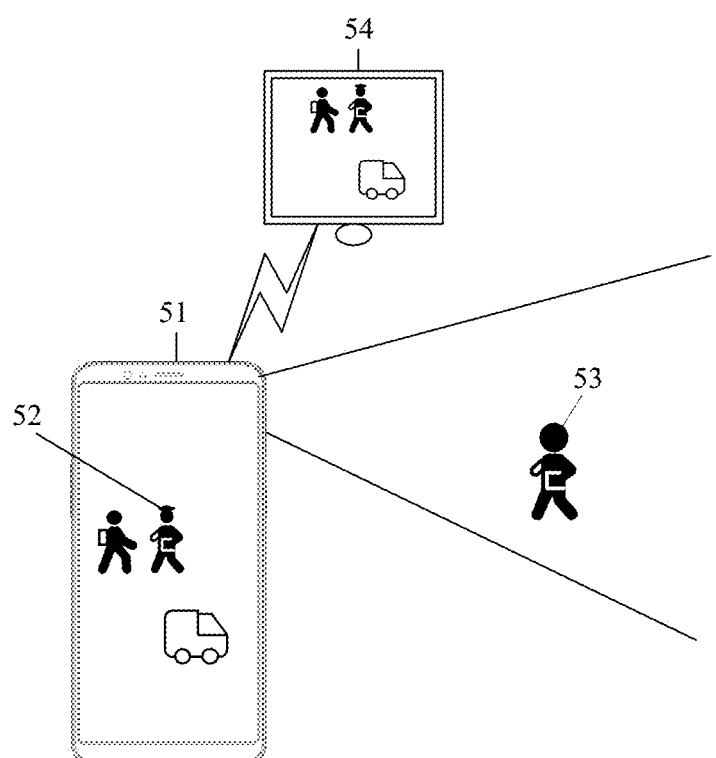
FIG. 8 is yet another application scenario of a method for controlling virtual objects according to an embodiment of the present disclosure.

Referring to FIG. 8, the figure shows yet another application scenario of a method for controlling virtual objects according to an embodiment of the present disclosure.

In the application scenario, a smart phone 51 and a third-party display device 54 are included. Target image information of a virtual object 52 is displayed in a display screen of the smart phone 51. The virtual object 52 may acquire information of a human body 53 through a depth camera and a color camera. Postures, such as squatting, jumping and waving, are defined according to the angle or movement trajectory of the limbs and the trunk of the human body 53, so as to generate human body model information to control the behavior of the virtual object 52 in a game.

The target image information may be transmitted from the smart phone 51 to the third-party display device 54 through a network or a transmission line. The third-party display device 54 displays the received target image information in real time, a user can conduct controlling through the smart phone 51, and meanwhile watch the target image information through the third-party display device 54, so as to have a body-sense experience based on a two-screen integrated technology.

As can be seen from the above, this mode does not require addition of motion sensors, and accurate virtual object control can be experienced with the help of a smart phone only, thereby greatly improving the convenience of the entertainment process.

Figure 9:
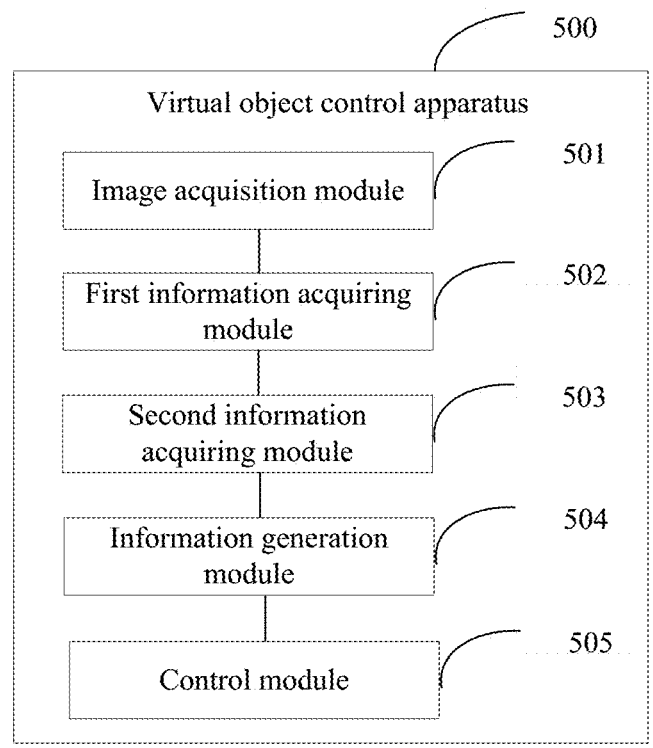
FIG. 9 is a schematic structure diagram of an electronic device according to an embodiment of the present disclosure.

Referring to FIG. 9, the figure shows a structure of a virtual object control apparatus according to an embodiment of the present disclosure.

The virtual object control apparatus 500 is applied to an electronic device, and includes an image acquisition module 501, a first information acquiring module 502, a second information acquiring module 503, an information generation module 504, and a control module 505.

The image acquisition module 501 is configured to acquire a two-dimensional image and a depth image of a human body.

The two-dimensional image is an image composed of a plurality of pixels (sampling points), which may be a color image or a monochrome image. The two-dimensional image may be acquired by an image sensor. The image sensor may be an RGB image sensor or may also be an infrared sensor. An image containing two-dimensional information of an environment object is acquired by the image sensor.

The depth image is also an image composed of a plurality of pixels (sampling points), and may include position information of each pixel (sampling point) in the depth image and a depth parameter corresponding to each pixel (sampling point), where the depth parameter is a distance value between hardware for acquiring the depth image and a real object corresponding to the pixel point in the depth image.

The depth image may be acquired by a depth image sensor, wherein the depth image sensor includes a TOF image sensor or a structured light sensor.

The first information acquiring module 502 is configured to acquire two-dimensional feature information of the human body according to the two-dimensional image.

Through the two-dimensional image, feature identification may be performed on the two-dimensional image to determine the position of the human body and an image range of the human body.

In at least one exemplary implementation, feature identification may be performed on the two-dimensional image by using a preset neural network model to determine whether an image of a human body exists in the two-dimensional image by identifying whether the two-dimensional image includes feature parts of the human body.

When it is determined that there is an image of the human body, the motion of the human body is determined according to the positional change of the feature parts.

In some embodiments, in order to construct two-dimensional feature information of the human body to apply the two-dimensional feature information to control of a virtual object, the operation that two-dimensional feature information of the human body is acquired according to the two-dimensional image may be implemented in the following manner.

Feature parts of the human body and corresponding positions of the feature parts are identified according to the two-dimensional image by using a preset neural network model; and two-dimensional feature information of the human body is constructed according to the feature parts of the human body and the corresponding feature positions of the feature parts.

The two-dimensional feature information includes feature parts of the human body and corresponding positions of the feature parts, so that when a user makes a motion, the motion type and motion track of the user may be determined by identifying the position change of the feature parts of the human body of the user.

In some embodiments, the feature parts may be key parts of the human body, such as a main articulation point of the human body, or a hand or head of the human body.

In at least one exemplary implementation, the feature parts may include a head, a neck, a left shoulder, a left elbow, a left wrist, a left waist, a left knee, a left ankle, a right shoulder, a right elbow, a right wrist, a right waist, a right knee, a right ankle or the like of the human body.

It will be appreciated that the actual disclosure may not be limited to the above-mentioned feature parts, and may be other more detailed parts, such as the eyes, ears, nose and mouth of the human body, which will not be described herein.

In some embodiments, an image may be identified by a mobilenet-Openpose model to identify two-dimensional feature information of the human body.

The second information acquiring module 503 is configured to acquire three-dimensional feature information of the human body according to the depth image.

The three-dimensional feature information may include depth parameters of various portions in a range of the human body in the image, so that three-dimensional images of the human body may be constructed by the depth parameters.

In some embodiments, in order to acquire the three-dimensional feature information of the human body, it is necessary to acquire a range of the human body in the depth image, and depth parameters within the range. The process of acquiring the three-dimensional feature information of the human body according to the depth image may be implemented in the following manner.

The depth image is analyzed to acquire a contour image and corresponding depth parameter of respective portions of the contour image; and three-dimensional feature information of the human body is constructed according to the contour image and the corresponding depth parameters.

By segmenting the depth image, the contours of all objects in the depth image may be acquired. The image may be segmented using a histogram segmentation algorithm.

Then, by using the acquired two-dimensional feature information, the position of the contour to which the human body belongs in the depth image can be identified, and then the depth parameter corresponding to each portion of the contour to which the human body belongs is determined.

After acquiring the contour image of the human body and the corresponding depth parameters of respective portions of the contour image, the three-dimensional feature information of the human body may be acquired according to the above data.

Due to the factor that there is no interrelation or dependency relationship between the acquisition of the two-dimensional feature information and the three-dimensional feature information, no specific running sequence for the first information acquiring module 502 and the second information acquiring module 503 is limited herein. It is appreciated that a running sequence in which the first information acquiring module 502 runs after the second information acquiring module 503, or a running sequence in which the second information acquiring module 503 runs after the first information acquiring module 502, or a running sequence in which the first information acquiring module 502 and the second information acquiring module 503 run simultaneously or independently are all acceptable.

The information generation module 504 is configured to combine the two-dimensional feature information of the human body with the three-dimensional feature information of the human body to generate human body model information.

The human body model information may be information to be input for controlling the virtual object. In at least one exemplary implementation, the information may be a position change parameter of the acquired feature part of the human body, such as a displacement distance and a swing frequency of each part of the human body. The position change parameter may be related to a depth parameter of each part of the human body and a displacement parameter in the two-dimensional image, or may be three-dimensional shape information of the human body formed by the position change parameter of the feature part of the human body.

Of course, the human body model information may also be other information related to the acquired human body motion change required to form a human body model according to a preset construction manner, and a specific form of the human body model may be determined according to actual conditions.

Compared with the method of forming the human body model information based on the depth parameter only, or by merely identifying the human image in the two-dimensional image, the embodiment combines the two-dimensional feature information of the human body with the three-dimensional feature information of the human body to acquire the human body model information, so that human-related motion data can be acquired from different dimensions, making the acquired human motion parameters more precise, thereby greatly improving the control precision in the process of controlling virtual objects by using human motion.

The control module 505 is configured to control a virtual object according to the human body model information.

The virtual object may be a fictitious character. The virtual object may be modeled according to a construction rule of the human body model information, that is, the virtual object may be in mutual correspondence with human body feature point information corresponding to the human body model information. The virtual object may be a character in a game application or a virtual character in an instant communication process.

Further, the body part of the human body model information may be tracked, such as the head, the body, and posture angles of the hand(s) and the foot (feet), to determine the corresponding motion posture, such as squatting, jumping, or waving. The virtual object is controlled to make a corresponding action according to the determined motion posture.

It can be seen that in the embodiments of the present disclosure, a two-dimensional image and a depth image of a human body are acquired, corresponding two-dimensional feature information and three-dimensional feature information of the human body are extracted from the two-dimensional image and the depth image, and the two-dimensional feature information and the three-dimensional feature information are combined to generate human body model information for controlling a virtual object. The embodiments of the present disclosure may combine the advantages of a two-dimensional image and a depth image to identify the motions of different parts of a human body, so that the precision of parameters of human body model information is greatly improved, thereby improving the control precision of a virtual object.

Figure 10:
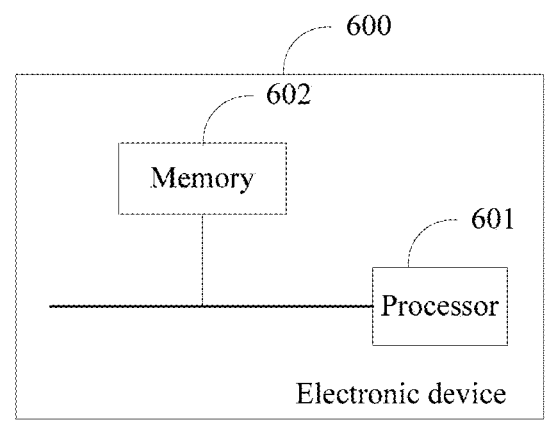
FIG. 10 is a schematic structure diagram of an electronic device according to an embodiment of the present disclosure.

The embodiment of the present disclosure also provides an electronic device. Referring to FIG. 10, the electronic device 600 includes a processor 601 and a memory 602. The processor 601 is electrically connected to the memory 602.

The processor 600 is a control center of the electronic device 600, and is configured to connect all parts of the entire electronic device by utilizing various interfaces and lines, to run or execute a computer program stored in the memory 602, and to call data stored in the memory 602 to execute various functions of the electronic device 600 and process data, so as to wholly monitor the electronic device 600.

The memory 602 may be configured to store a software program and a module, and the processor 601 executes various function applications and performs data processing by running the computer program and the module stored in the memory 602. The memory 602 may mainly include a storage program area and a storage data area, where the storage program area may store an operating system, a computer program required for at least one function (such as a sound playing function and an image playing function); and the storage data area may store data created according to the use of the electronic device. In addition, the memory 602 may include a high-speed RAM, and may further include a non-volatile memory such as a disk storage device, a flash device, or other non-volatile solid storage devices. Correspondingly, the memory 602 may further include a memory controller which provides access of the processor 601 to the memory 602.

The electronic device 600 may further include an RGB image sensor and a depth image sensor.

The RGB image sensor is configured to acquire a two-dimensional image.

The depth image sensor is configured to acquire a depth image.

In the embodiment of the present disclosure, the processor 601 in the electronic device 600 loads instructions corresponding to the process of one or more computer programs into the memory 602 according to the following operations, and the processor 601 runs the computer program stored in the memory 602, thereby implementing various functions.

A two-dimensional image and a depth image of a human body are acquired.

Two-dimensional feature information of the human body is acquired according to the two-dimensional image.

Three-dimensional feature information of the human body is acquired according to the depth image.

The two-dimensional feature information of the human body is combined with the three-dimensional feature information of the human body to generate human body model information.

A virtual object is controlled according to the human body model information.

In some implementation manners, the processor 601 may perform the following operations.

According to the two-dimensional image, feature parts of the human body and corresponding positions of the feature parts are identified by using a preset neural network model.

Two-dimensional feature information of the human body is constructed according to the feature parts of the human body and the corresponding feature positions of the feature parts.

In some implementation manners, the processor 601 may perform the following operations.

A position relationship between the feature parts is acquired.

The feature parts are identified and associated according to the position relationship to form a human body frame.

Two-dimensional feature information of the human body is constructed according to the human body frame.

In some implementation manners, the processor 601 may perform the following operations.

The depth image is analyzed to acquire a contour image and corresponding depth parameter of respective portions of the contour image.

Three-dimensional feature information of the human body is constructed according to the contour image and the corresponding depth parameters.

In some implementation manners, when acquiring an image of a human body, the processor 601 may perform the following operations.

According to the two-dimensional image, feature parts of the human body and corresponding positions of the feature parts are identified by using a preset neural network model.

Corresponding projection positions of the positions of the feature parts in the depth image are determined.

A range of the human body in the depth image is determined based on the projection positions.

Depth parameters of the human body within the range are acquired according to the range of the human body in the depth image, wherein the depth parameters of the human body within the range are used for generating the human body model information.

In some implementation manners, the processor 601 may further perform the following operations.

The projection positions are combined with the contour image to determine a contour position of the human body contained in the contour image.

The range of the human body in the depth image is determined according to the contour position of the human body.

In some implementation manners, the processor 601 may further perform the following operations.

It is determined whether the two-dimensional image contains two-dimensional feature information of the human body.

In response to determining that the two-dimensional image does not contain the two-dimensional feature information of the human body, the operation of combining the two-dimensional feature information of the human body with the three-dimensional feature information of the human body is not performed.

It can be seen that according to the electronic device in the embodiments of the present disclosure, a two-dimensional image and a depth image of a human body are acquired, corresponding two-dimensional feature information and three-dimensional feature information of the human body are extracted from the two-dimensional image and the depth image, and the two-dimensional feature information and the three-dimensional feature information are combined to generate human body model information for controlling a virtual object. The embodiments of the present disclosure may combine the advantages of a two-dimensional image and a depth image to identify the motions of different parts of a human body, so that the precision of parameters of human body model information is greatly improved, thereby improving the control precision of a virtual object.

Figure 11:
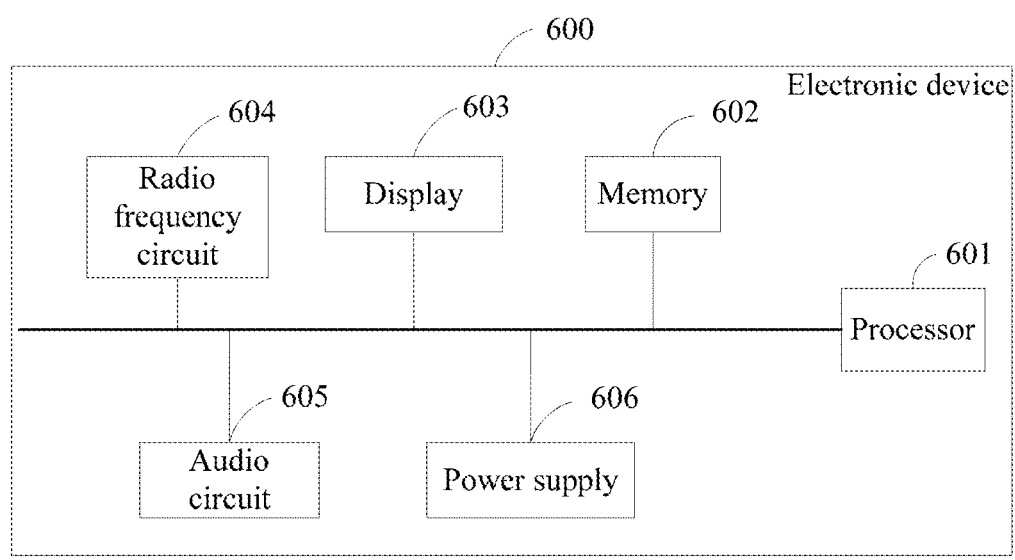
FIG. 11 is another schematic structure diagram of an electronic device according to an embodiment of the present disclosure.

Further referring to FIG. 11, in some implementation manners, the electronic device 600 may further include: a display 603, a radio frequency circuit 604, an audio circuit 605, and a power supply 606. The display 603, the radio frequency circuit 604, the audio circuit 605 and the power supply 606 are electrically connected to the processor 601, respectively.

The display 603 may be used to display information input by a user or information provided to the user and various graphical user interfaces that may be composed of graphics, text, icons, video, and any combination thereof. The display 603 may include a display panel. In some implementation manners, the display panel may be configured in a form of a Liquid Crystal Display (LCD), an Organic Light-Emitting Diode (OLED), etc.

The radio frequency circuit 604 may be used to transmit and receive radio frequency signals to establish wireless communication with network devices or other electronic devices through wireless communication, and to transmit and receive signals with network devices or other electronic devices.

The audio circuit 605 may be used to provide an audio interface between the user and the electronic device through a loudspeaker and a microphone.

The power supply 606 may be used to power various components of the electronic device 600. In some embodiments, the power supply 606 may be connected to the processor 601 logically via a power supply management system, so as to implement functions of charging, discharging and power consumption management by means of the power supply management system.

Although not shown in FIG. 11, the electronic device 600 may further include a camera, a Bluetooth module, and the like, and details are not described herein.

The embodiment of the present disclosure also provides a non-transitory computer readable storage medium, being configured to store programs, which when executed by a processor, are operable with the processor to perform the method for controlling virtual objects in any of the above embodiments. For example, a two-dimensional image and a depth image of a human body are acquired; two-dimensional feature information of the human body is acquired according to the two-dimensional image; three-dimensional feature information of the human body is acquired according to the depth image; the two-dimensional feature information of the human body is combined with the three-dimensional feature information of the human body to generate human body model information; and a virtual object is controlled according to the human body model information.

In the embodiment of the present disclosure, the non-transitory computer readable storage medium may be a magnetic disk, an optical disk, a Read-Only Memory (ROM), or a Random Access Memory (RAM).

In the above embodiment, descriptions of each embodiment are emphasized respectively, and parts which are not elaborated in detail in a certain embodiment may refer to relevant descriptions of other embodiments.

It is to be noted that, for the virtual object control method in the embodiments of the present disclosure, a common tester in the art can understand all or part of the flow of implementing the method for controlling virtual objects in the embodiments of the present disclosure may be completed by controlling related hardware through a computer program. The computer program may be stored in a non-transitory computer-readable storage medium, such as in a memory of the electronic device, and executed by at least one processor in the electronic device. The flow of the embodiment, for example, the method for controlling virtual objects may be included during execution. The storage medium may be a magnetic disk, an optical disk, a ROM, a RAM, etc.

For the electronic device of the embodiment of the present disclosure, each functional module may be integrated into one processing chip, or each module may exist physically separately, or two or more modules may be integrated into one module. The integrated module may be implemented in a hardware form and may also be implemented in form of software functional module. When being implemented in form of software functional module and sold or used as an independent product, the integrated module may be stored in a computer-readable storage medium such as a ROM, a magnetic disk or an optical disk.

The electronic device provided by the embodiment of the present disclosure is the same as the virtual object control method in the foregoing embodiment, and any method provided in the embodiment of the virtual object control method may be run on the electronic device, the specific implementation process is described in the embodiment of the virtual object control method, and details are not described herein again.

The above is a detailed description of a method for controlling virtual objects, a non-transitory computer readable storage medium and an electronic device provided by the embodiments of the present disclosure. The principle and implementation manner of the present disclosure are described in the specific examples herein. The description of the embodiments is only for helping to understand the method of the present disclosure and its core ideas. Furthermore, for those skilled in the art, according to the idea of the present disclosure, there will be changes in specific implementation manners and disclosure scopes. In conclusion, the above description should not be taken as limiting the present disclosure.

What is claimed is:

1. A method for controlling virtual objects, comprising:
   acquiring a two-dimensional image and a depth image of a human body;
   acquiring two-dimensional feature information of the human body according to the two-dimensional image;
   acquiring three-dimensional feature information of the human body according to the depth image;
   combining the two-dimensional feature information of the human body with the three-dimensional feature information of the human body to generate human body model information, wherein the two-dimensional image and the depth image are used for identifying the motions of different parts of a human body; and
   controlling a virtual object according to the human body model information, wherein the virtual object is modeled according to a construction rule of the human body model information, the virtual object is in mutual correspondence with human body feature point information corresponding to the human body model information;

wherein combining the two-dimensional feature information of the human body with the three-dimensional feature information of the human body to generate human body model information comprises:
identifying, according to the two-dimensional image, feature parts of the human body and corresponding positions of the feature parts by using a preset neural network model;
determining corresponding projection positions of the positions of the feature parts in the depth image;
determining a range of the human body in the depth image based on the projection positions; and
acquiring depth parameters of the human body within the range according to the range of the human body in the depth image, wherein the depth parameters of the human body within the range are used for generating the human body model information.

2. The virtual object control method as claimed in claim 1, wherein acquiring two-dimensional feature information of the human body according to the two-dimensional image comprises:
identifying, according to the two-dimensional image, feature parts of the human body and corresponding positions of the feature parts by using a preset neural network model; and
constructing the two-dimensional feature information of the human body according to the feature parts of the human body and the corresponding feature positions of the feature parts.

3. The virtual object control method as claimed in claim 2, wherein constructing the two-dimensional feature information of the human body according to the feature parts of the human body and the corresponding feature positions of the feature parts comprises:
acquiring a position relationship between the feature parts;
identifying and associating the feature parts according to the position relationship to form a human body frame; and
constructing the two-dimensional feature information of the human body according to the human body frame.

4. The virtual object control method as claimed in claim 1, wherein acquiring three-dimensional feature information of the human body according to the depth image comprises:
analyzing the depth image to acquire a contour image and corresponding depth parameters of respective portions of the contour image; and
constructing the three-dimensional feature information of the human body according to the contour image and the corresponding depth parameters.

5. The virtual object control method as claimed in claim 1, wherein determining a range of the human body in the depth image based on the projection positions comprises:
combining the projection positions with the contour image to determine a contour position of the human body contained in the contour image; and
determining the range of the human body in the depth image according to the contour position of the human body.

6. The virtual object control method as claimed in claim 1, wherein before combining the two-dimensional feature information of the human body with the three-dimensional feature information of the human body to generate human body model information, the method further comprises:
determining whether the two-dimensional image contains the two-dimensional feature information of the human body.

7. The virtual object control method as claimed in claim 1, wherein before combining the two-dimensional feature information of the human body with the three-dimensional feature information of the human body to generate human body model information, the method comprises:
performing frame alignment on the two-dimensional image corresponding to the two-dimensional feature information and the depth image corresponding to the three-dimensional feature information, so as to confirm that the two-dimensional image and the depth image correspond to a same moment.

8. The virtual object control method as claimed in claim 1, wherein the depth image is acquired by a depth image sensor, wherein the depth image sensor comprises a time-of-flight (TOF) image sensor or a structured light sensor.

9. An electronic device, comprising an image sensor; a depth image sensor; a memory, configured to store executable program codes; a processor, coupled with the memory; wherein
the image sensor is configured to acquire a two-dimensional image;
the depth image sensor is configured to acquire a depth image; and
the processor is configured to invoke the executable program codes stored in the memory to perform the following operations:
acquiring two-dimensional feature information of the human body according to the two-dimensional image;
acquiring three-dimensional feature information of the human body according to the depth image;
combining the two-dimensional feature information of the human body with the three-dimensional feature information of the human body to generate human body model information, wherein the two-dimensional image and the depth image are used for identifying the motions of different parts of a human body; and
controlling a virtual object according to the human body model information, wherein the virtual object is modeled according to a construction rule of the human body model information, the virtual object is in mutual correspondence with human body feature point information corresponding to the human body model information;
wherein combining the two-dimensional feature information of the human body with the three-dimensional feature information of the human body to generate human body model information comprises:
identifying, according to the two-dimensional image, feature parts of the human body and corresponding positions of the feature parts by using a preset neural network model;
determining corresponding projection positions of the positions of the feature parts in the depth image;
determining a range of the human body in the depth image based on the projection positions; and
acquiring depth parameters of the human body within the range according to the range of the human body in the depth image, wherein the depth parameters of the human body within the range are used for generating the human body model information.

10. The electronic device as claimed in claim 9, wherein the image sensor is an RGB image sensor or an infrared sensor.

11. The electronic device as claimed in claim 9, wherein the depth image sensor comprises a time-of-flight (TOF) image sensor or a structured light sensor.

12. The electronic device as claimed in claim 9, wherein the processor calls the computer program to implement the following operations:
   identifying, according to the two-dimensional image, feature parts of the human body and corresponding positions of the feature parts by using a preset neural network model; and
   constructing the two-dimensional feature information of the human body according to the feature parts of the human body and the corresponding feature positions of the feature parts.

13. The electronic device as claimed in claim 12, wherein the processor calls the computer program to implement the following operations:
   acquiring a position relationship between the feature parts;
   identifying and associating the feature parts according to the position relationship to form a human body frame; and
   constructing the two-dimensional feature information of the human body according to the human body frame.

14. The electronic device as claimed in claim 9, wherein the processor calls the computer program to implement the following operations:
   analyzing the depth image to acquire a contour image and corresponding depth parameters of respective portions of the contour image; and
   constructing the three-dimensional feature information of the human body according to the contour image and the corresponding depth parameters.

15. The electronic device as claimed in claim 14, wherein the processor calls the computer program to implement the following operations:
   identifying, according to the two-dimensional image, feature parts of the human body and corresponding positions of the feature parts by using a preset neural network model;
   determining corresponding projection positions of the positions of the feature parts in the depth image;
   determining a range of the human body in the depth image based on the projection positions; and
   acquiring depth parameters of the human body within the range according to the range of the human body in the depth image, wherein the depth parameters of the human body within the range are used for generating the human body model information.

16. The electronic device as claimed in claim 15, wherein the processor calls the computer program to implement the following operations:
   combining the projection positions with the contour image to determine a contour position of the human body contained in the contour image; and
   determining the range of the human body in the depth image according to the contour position of the human body.

17. The electronic device as claimed in claim 15, wherein the processor further calls the computer program to implement the following operations:
   determining whether the two-dimensional image contains the two-dimensional feature information of the human body.

18. The electronic device as claimed in claim 9, wherein the processor further calls the computer program to implement the following operations:
   performing frame alignment on the two-dimensional image corresponding to the two-dimensional feature information and the depth image corresponding to the three-dimensional feature information, so as to confirm that the two-dimensional image and the depth image correspond to a same moment.

19. A non-transitory computer readable storage medium, being configured to store programs, which when executed by a processor, are operable with the processor to carry out operations comprising:
   acquiring a two-dimensional image and a depth image of a human body;
   acquiring two-dimensional feature information of the human body according to the two-dimensional image;
   acquiring three-dimensional feature information of the human body according to the depth image;
   combining the two-dimensional feature information of the human body with the three-dimensional feature information of the human body to generate human body model information, wherein the two-dimensional image and the depth image are used for identifying the motions of different parts of a human body; and
   controlling a virtual object according to the human body model information, wherein the virtual object is modeled according to a construction rule of the human body model information, the virtual object is in mutual correspondence with human body feature point information corresponding to the human body model information;
   wherein combining the two-dimensional feature information of the human body with the three-dimensional feature information of the human body to generate human body model information comprises:
   identifying, according to the two-dimensional image, feature parts of the human body and corresponding positions of the feature parts by using a preset neural network model;
   determining corresponding projection positions of the positions of the feature parts in the depth image;
   determining a range of the human body in the depth image based on the projection positions; and
   acquiring depth parameters of the human body within the range according to the range of the human body in the depth image, wherein the depth parameters of the human body within the range are used for generating the human body model information.

* * * * *